United States Patent [19]  [11] 4,226,337
Abbott  [45] Oct. 7, 1980

[54] LAMINATED TUBE FOR COLLAPSIBLE CONTAINERS AND METHOD OF MAKING SAME

[76] Inventor: Joseph L. Abbott, 109 Primrose Pl., Lima, Ohio 45805

[21] Appl. No.: 932,220

[22] Filed: Aug. 11, 1978

Related U.S. Application Data

[63] Continuation-in-part of Ser. No. 845,478, Oct. 26, 1977, abandoned.

[51] Int. Cl.³ .............................................. B65D 35/10
[52] U.S. Cl. ................................................. 222/107
[58] Field of Search ................. 222/107; 425/113, 122, 425/129; 264/173, 174, 177 R, 259, 271

[56] References Cited

U.S. PATENT DOCUMENTS

| | | |
|---|---|---|
| 2,268,462 | 12/1941 | Sachsenroder et al. . |
| 3,260,410 | 7/1966 | Brandt et al. .......................... 222/107 |
| 3,332,138 | 7/1967 | Garner ............................... 264/173 X |
| 3,381,818 | 5/1968 | Cope et al. . |
| 3,418,404 | 12/1968 | Hird . |
| 3,649,282 | 3/1972 | Campell . |
| 3,730,393 | 5/1973 | Ledewitz et al. . |
| 3,946,905 | 3/1976 | Cogliano . |
| 3,976,224 | 8/1976 | Ericson et al. . |
| 4,011,968 | 3/1977 | McGhie et al. ...................... 222/107 |

FOREIGN PATENT DOCUMENTS 1212253 11/1970 United Kingdom ..................... 222/107
1421176 1/1976 United Kingdom ..................... 222/107

Primary Examiner—Stanley H. Tollberg
Attorney, Agent, or Firm—Meyer, Tilberry & Body

[57] ABSTRACT

A laminated tube adapted to be used as the body of a collapsible dispensing container includes an inner layer of an epoxy resin, an intermediate layer of aluminum foil and an outer layer of thermoplastic material. The tube is made by forming a foil and epoxy resin laminate into tubular form having longitudinally extending circumferentially overlapped edges, and extruding thermoplastic material about the foil.

22 Claims, 5 Drawing Figures

LAMINATED TUBE FOR COLLAPSIBLE CONTAINERS AND METHOD OF MAKING SAME

CROSS REFERENCE TO RELATED APPLICATION

This application is a continuation-in-part of my co-pending patent application Ser. No. 845,478 filed Oct. 26, 1977, now abandoned.

BACKGROUND OF THE INVENTION

This invention relates to the art of collapsible dispensing containers and, more particularly, to a laminated tube structure for the body of such a container and a method of making the tube.

Collapsible tubular containers are provided for dispensing a wide variety of products including, for example, cosmetics, shampoos, foods, dentifrices and the like. Problems encountered in connection with oxygen absorption and product contamination and permeation have led to considerable efforts to provide laminated constructions for the body portions of the dispensing containers to overcome the problems. Such laminated constructions generally include a barrier layer of metal foil to eliminate oxygen absorption and water vapor transmission and inner and outer layers of a thermoplastic material such as polyethylene. The inner layer of polyethylene protects the product from contamination by the metal foil but, while such inner layer can be made relatively thin, an undesirable degree of product permeation still takes place causing deterioration of the product in the container. Heretofore, the tubular body portions of such containers have been produced by forming a flat laminate into tubular form with overlapping edges and then heat sealing the edges to provide a tube having a longitudinal seam. Such a heat sealed construction necessitates heat sealing compatibility of the inner and outer layers of the laminate and thus requires both layers to be thermoplastic. Accordingly, such previous methods of construction limit selectivity of materials and thus limit the use of containers employing such body constructions. Moreover, the compatibility requirements for heat sealing have made it impossible to employ thermosetting plastic materials for the inner surface of the tubular body so as to minimize the product permeation problem for the inner layer of a container.

With further regard to such previous container body constructions, the longitudinal seam produced by heat sealing the laminate edges creates problems with respect to providing indicia on the outer surface of the tubular body. In this respect, such a longitudinal seam makes it necessary to pre-print the plastic film defining the outer layer of the laminate by rotogravure printing methods. More particularly, the presence of a longitudinal heat sealed seam in the tubular body portion provides an interruption in the otherwise circular outer surface contour of the tube, whereby the tube cannot be printed upon after formation thereof by less expensive techniques such as roll printing. Still further, such a longitudinal heat sealed seam is visible and, accordingly, is undesirable from the standpoint of aesthetics.

DEFINITIONS

Mechanical bond, or mechanically bonded, as used herein means a bond in which two films or layers of material are adhered to one another such that they can be peeled apart.

Thermal bond, or thermally bonded, as used herein means a bond in which two films or layers of material are fused or otherwise adhered to one another such that they cannot be peeled apart without rupturing or tearing one of the films, or layers.

Heat sealed, or heat sealing, as used herein means a thermal bond.

Bond, or bonded, as used herein without reference to either a mechanical or a thermal bond means a bond in which two films or layers of material are adhered either by a mechanical bond or by a thermal bond.

SUMMARY OF THE INVENTION

The disadvantages of collapsible dispensing container bodies heretofore provided, and the disadvantages of the methods of construction thereof are minimized or overcome in accordance with the present invention. In this respect, the present invention enables the production of a tubular dispensing container body having an inner surface which is less permeable than those of laminated structures heretofore provided, enables the production of a collapsible container body having an outer surface uninterrupted by a longitudinal heat sealed seam, and enables the use of a wide variety of materials in producing a tubular dispensing container body by avoiding the necessity for compatible thermoplastic materials to enable heat sealing. In accordance with one aspect of the present invention, the inner surface of a laminated tube for use as a collapsible container body is defined by a thermosetting plastic material which, preferably, is an epoxy resin. In accordance with another aspect of the invention, a laminated tube for use as a dispensing container body includes a tubular core having circumferentially overlapping marginal side edges, the core being enclosed in a seamless sheath of plastic material in a manner which provides structural integrity for the longitudinal seam without the presence of a heat sealed seam along the tube.

In accordance with a preferred embodiment of the invention, a dispensing container body tube is produced by forming a sheet or laminate of core material into a tubular configuration having circumferentially overlapping marginal side edges and then encapsulating the tubular core in a seamless sheath of flowable plastic material, such as by extrusion of the plastic about the core. This advantageously enables the use of thermally incompatible materials for the inner and outer layers of the tube, and enables the use of a thermosetting plastic for the inner layer of the tube. In this respect, the plastic sheath is bonded to the core and thus maintains the core in tubular form, advantageously avoiding the necessity for a heat sealing compatibility between the material of the sheath and a layer of the core defining the inner surface of the tube. Additionally, by avoiding a heat sealed seam the tube can be roll printed after it is produced.

Further, in accordance with a preferred embodiment of the invention, the overlapped marginal side edges of the core are interlocked with the sheath material in a manner which optimizes the structural integrity of the seam when the core is encapsulated and stabilizes the radially inner one of the marginal side edges against displacement inwardly of the tubular body. Such an interlocked relationship preferably is achieved by providing a thin bead of the sheath material along and about the longitudinal edge of the radially inner one of the overlapped marginal side edges prior to extrusion of the sheath material about the core. During the extrusion operation the material of the bead fuses and becomes integral with the material of the extruded sheath. The heating of the bead material during the extrusion process provides for the overlapped marginal edges to be mechanically bonded to one another by the interposed layer of the bead material, and fusing of the bead material with the sheath provides continuity of the sheath material between the overlapped marginal edges and about the longitudinal side edge of the radially inner one of the marginal edges. This mechanical bonding is sufficient to prevent displacement of the radially inner one of the overlapped marginal edges inwardly of the tubular body relative to the outer one of the edges and which displacement would leave only the sheath material along the longitudinal seam to hold the core in tubular form. Additionally, the continuity of the sheath material about the side edge of the radially inner one of the marginal edges, locks the overlapped edges against circumferential displacement in the direction of overlap. Thus the structural integrity of the seam is optimized and, if the core includes a barrier layer of metal foil, the bead advantageously covers the otherwise exposed edge thereof along the seam.

It is accordingly an outstanding object of the present invention to provide an improved laminated tube construction for use as a body of a collapsible dispensing container.

Another object is the provision of a laminated tube construction of the foregoing character having an inner surface which provides improved resistance to product permeation.

Yet another object is the provision of a laminated tube construction of the foregoing character having inner and outer layers of thermally incompatible plastic materials.

Still another object is the provision of a laminated tube construction of the foregoing character which is free of any heat sealed seams.

A further object is the provision of a laminated tube construction of the foregoing character having an inner layer of thermosetting plastic material, a barrier layer and an outer layer of plastic material.

Still a further object is the provision of a laminated tube construction of the foregoing character including a tubular core having longitudinally extending circumferentially overlapped marginal side edges encased in a seamless sheath of plastic material in a manner whereby the marginal side edges are interlocked with the sheath material against relative circumferential displacement of the overlapped edges and radially inward displacement of the inner one of the marginal side edges.

Yet a further object is the provision of a laminated tube construction of the foregoing character which includes a tubular core laminate of metal foil and thermosetting plastic encapsulated in a seamless sheath of plastic material.

Another object is the provision of an improved method for making a laminated tube for use as the body portion of a collapsible dispensing container.

Yet another object is the provision of a method of the foregoing character which enables a wider selectivity with respect to plastic materials included in the layers of the laminated tube.

Still another object is the provision of a method of the foregoing character which enables the tube to have an outer surface free of any visible longitudinal seams.

A further object is the provision of a method of the foregoing character which enables the tube to have inner and outer layers of plastic material which are incompatible for heat sealing.

Yet a further object is the provision of a method of the foregoing character which enables overlapping edges of a tubular core of the laminated tube to be interlocked with the material of a sheath enclosing the core in a manner which optimizes structural integrity of the longitudinal seam of the completed tube.

BRIEF DESCRIPTION OF THE DRAWING

The foregoing objects, and others, will in part be obvious and in part pointed out more fully hereinafter in conjunction with the written description of preferred embodiments of the invention shown in the accompanying drawings in which.

DESCRIPTION OF PREFERRED EMBODIMENTS

Figure 1:
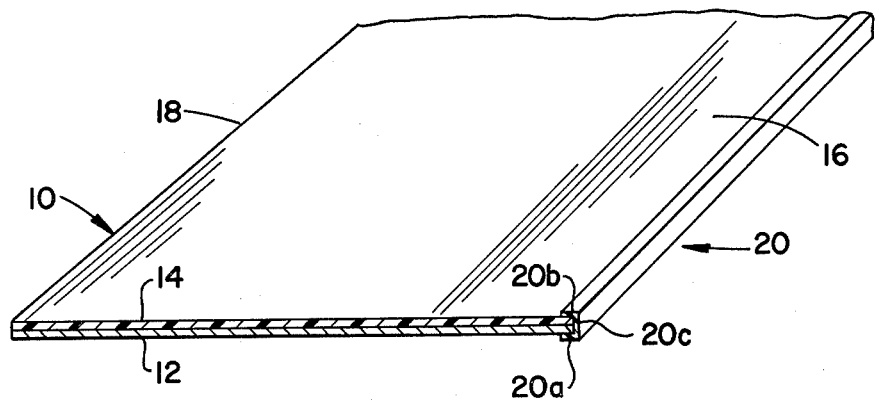
FIG. 1 is a perspective view of a core laminate for a laminated tube constructed in accordance with the present invention.
Figure 2:
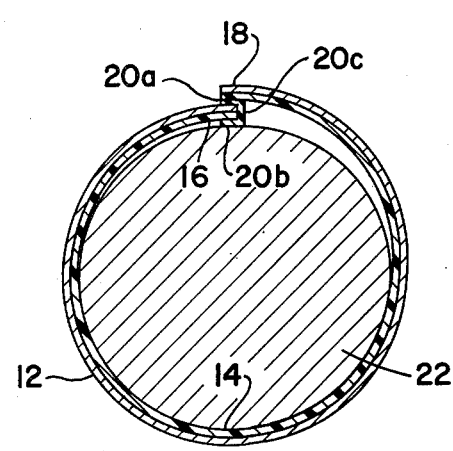
FIG. 2 is a cross-sectional view showing the core laminate when initially formed into a tube.

Referring now in greater detail to the drawings wherein the showings are for the purpose of illustrating preferred embodiments of the invention only and not for the purpose of limiting the invention, FIG. 1 illustrates a core laminate 10 comprised of a barrier layer 12 preferably of metallic foil and a layer of thermosetting plastic material 14 suitably bonded to one side of the barrier layer. Laminate 10 has longitudinally extending opposite marginal side edges 16 and 18 and, as set forth more fully hereinafter, marginal edge 16 is provided with a thin bead or film of plastic material 20 after which the laminate is formed about a mandrel 22 to a tubular configuration as shown in FIG. 2. More particularly, it will be seen that film 20 is longitudinally coextensive with marginal edge 16 and includes a portion 20a extending laterally inwardly over barrier layer 12, a portion 20b extending laterally inwardly over thermosetting plastic layer 14, and a portion 20c extending across the vertical side edge of the laminate. When core laminate 10 is formed to the tubular configuration, marginal side edges 16 and 18 are disposed in circumferentially overlapping relationship with thermosetting plastic layer 14 disposed inwardly of the tube. Accordingly, marginal edge 16 becomes the radially inner one of the overlapped edges, and portion 20a of film 20 is disposed between marginal edges 16 and 18 and more particularly between the foil of marginal edge 16 and the thermosetting plastic of marginal edge 18.

Figure 3:
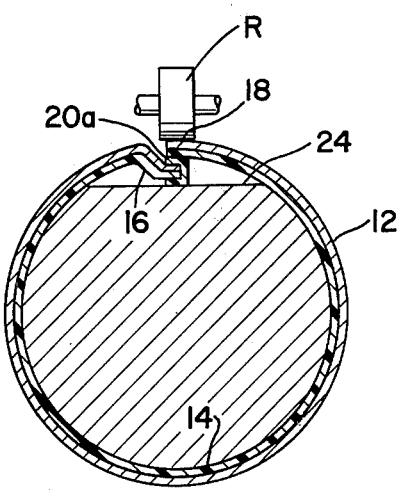
FIG. 3 is a cross-sectional view showing the core just prior to extrusion of the sheath material thereabout.
Figure 4:
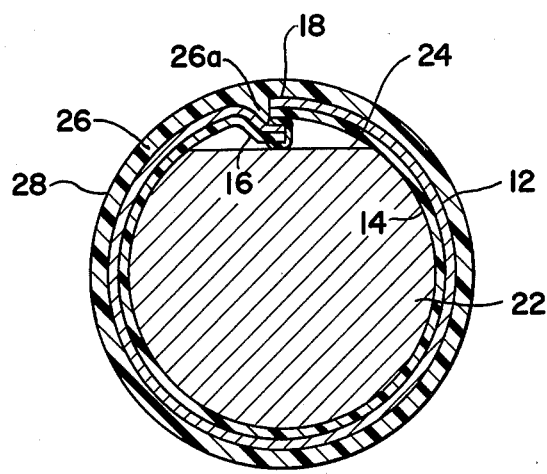
FIG. 4 is a cross-sectional view showing the completed tube.

As seen in FIG. 3, overlapping edges 16 and 18 are then displaced radially against a flat 24 on mandrel 22. As explained hereinafter, this enhances achieving a more uniform radial thickness of the sheath material in which the core is subsequently encapsulated. As seen in FIG. 4, the tubular core is then encapsulated in a seamless sheath of plastic material 26 which is bonded to the outer surface of barrier layer 12 so as to maintain the core in tubular form. Film 20 and sheath material 26 are of the same plastic material and during encapsulation, portion 20a of film 20 fuses with and becomes integral with sheath material 26. Film portion 20a mechanically bonds with the thermosetting plastic on marginal edge 18 to hold marginal edge 16 against displacement radially inwardly of the encapsulated core relative to marginal edge 18. This advantageously avoids a longitudinal line of potential weakness which would result from such displacement of marginal edge 16 in that the tube seam would then be defined only by the thickness of the sheath material in area 26a thereof. Further, the fusing of sheath material 26 with bead portion 20a provides a thermal bond therebetween, whereby bead 20 becomes an integral extension of the sheath which locks around the longitudinal inner edge of the core and thus advantageously resists any relative circumferential displacement of marginal edges 16 and 18 in the direction of overlap thereof. Thus, overlapped edges 16 and 18 are stabilized by the mechanical bond and the locking relationship, and the structural integrity of the longitudinal seam along the completed container body is optimized.

Encapsulation enables the outer surface 28 of the tube to be circular in cross-sectional contour and free of any longitudinal seams. Moreover, encapsulation avoids the necessity for heat sealing compatibility between the plastic materials of inner and outer layers 14 and 26 of the tube as is required to achieve a thermally bonded seam in tube constructions heretofore provided. At the same time, it will be appreciated that the materials of the inner and outer layers can be compatible if desired. Thus, inner and outer layers 14 and 26 in the embodiment described can be like or different thermosetting materials, or a combination of a thermosetting inner layer and a thermoplastic outer layer. Therefore, it will be appreciated that the inner and outer layers can be selected from a wide variety of materials depending on the particular product to be stored and dispensed from a collapsible container having a body portion made from the tube.

In the preferred embodiment, the thermosetting material of inner layer 14 is a high temperature setting epoxy resin, and outer layer 26 is a thermoplastic material, preferably a low density polyethylene. Barrier layer 12 is aluminum foil having a thickness of about 0.002 inch. Expoy layer 14 has a thickness of about 0.0005 inch, a suitable epoxy resin being that sold by Hanna Chemical Company of Columbus, Ohio under product designation H-11 or H-23, which has a curing temperature of about 550° F. and a curing time of about eight minutes. Polyethylene layer 26 has a thickness of about 0.003 inch and, with regard thereto, it will be appreciated that the thickness in the area 26a thereof will vary from the latter dimension. Bead 20 is also polyethylene, and portions 20a, 20b and 20c thereof each have a thickness of about 0.003 inch. Further, marginal edges 16 and 18 have a circumferential overlap of about 0.090 inch and bead portions 20a and 20b have a lateral width corresponding to the dimension of overlap.

Figure 5:
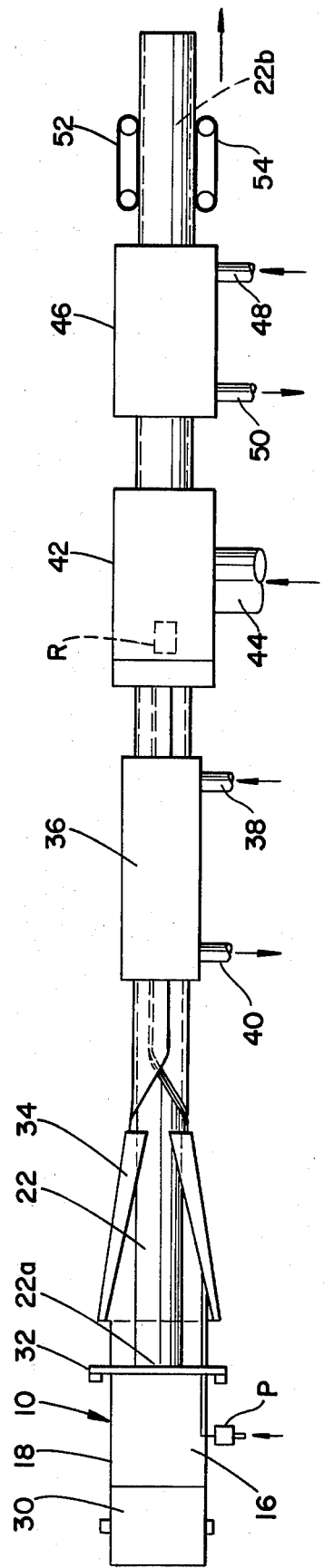
FIG. 5 is a plan view schematically illustrating apparatus by which a laminated tube is made in accordance with the present invention.

The laminated tube is preferably produced continuously, and the tubular core is preferably encapsulated in sheath 26 by extruding the sheath thereabout. FIG. 5 of the drawing schematically illustrates production of the tube in this manner. In this respect, a roll 30 of the laminated core material 10 is supported at one end of the forming apparatus to provide an indeterminate length of the core material. The forming apparatus includes circular mandrel 22 referred to hereinabove and which has an upstream end 22a thereof attached by welding or the like to a rigid support member 32. Mandrel 22 extends the full length of the apparatus and has a downstream terminal end 22b. Core material 10 is continuously fed from roll 30 to a forming plow 34 which, in a well known manner, operates to bend material 10 into tubular form about mandrel 22 as the core material moves through the plow. Bead 20 is applied in the form of molten thermoplastic material to edge 16 of the core material upstream from plow 34. The bead can for example be applied by means of a pump P having a nozzle structured and positioned to apply the bead as shown in FIG. 1. The plastic material of bead 20 can be supplied to pump P from any suitable source and, for example, can be supplied from the source of molten plastic for the sheath extruder referred to hereinafter.

It will be appreciated that plow 34 and mandrel 22 cooperate to form core material 10 substantially to the tubular configuration shown in FIG. 2 of the drawing. By the time bead 20 engages the mandrel surface it has cooled sufficiently to avoid any problems of adherence of bead portion 20b therewith. The tubular core material then passes along mandrel 22 through a sizing ring device 36 which, as is well known, serves to bring the tubular core to a desired cross-sectional dimension. Depending on the materials of the core laminate, it may be desirable to warm the material to enhance the sizing operation and, for this purpose, sizing member 36 preferably includes a circumferentially closed housing having inlet and outlet passages 38 and 40 for circulating hot air therethrough. From sizing member 36, the tubular core passes along mandrel 22 through an extrusion cross head die 42 by which outer layer 26 of plastic material is extruded onto the exterior surface of the tubular core. Preferably, to obtain a generally uniform radial thickness of extruded layer 26, roller R is provided at the entrance end of extrusion die 42 in cooperable relationship with flat 24 on mandrel 22 to form the radial step in overlapped marginal side edges 16 and 18 of laminate 10 as shown in FIG. 3.

The material extruded onto the tubular core can either be a thermoplastic or thermosetting plastic material and is fed to cross head die 42 through an inlet 44 leading from a plastic extruder, not shown. As mentioned hereinabove, pump P for applying head 20 to the core material can also be connected to the extruder to receive the molten plastic for the bead therefrom. In the preferred embodiment, outer layer 26 is a thermoplastic material and, accordingly, the sheathed tube exiting from cross head die 42 passes through a cooling jacket 46 to at least partially cure the extruded plastic layer. For this purpose, it will be appreciated that jacket 46 is provided with inlet and outlet passages 48 and 50, respectively, to facilitate the circulation of a suitable cooling medium therethrough. It will be further appreciated of course that a heating jacket would be employed if layer 26 was a thermosetting plastic. A suitable drive arrangement such as endless belts 52 and 54 is provided adjacent the outlet of cooling jacket 46 to facilitate driving the completed tube from the downstream end 22b of mandrel 22, and it will be appreciated that a suitable cut-off mechanism, not shown, is preferably provided beyond the downstream end of the mandrel to cut the finished tube into desired lengths.

While the preferred tube structure has an inner layer of a thermosetting plastic material, a layer of metal foil to which the thermosetting plastic layer is bonded and an outer layer of plastic bonded to the metal foil and providing the outer surface of the tube, it will be appreciated that layers of material could be interposed between the thermosetting plastic inner layer and metal foil and between the metal foil and outer plastic layer. It will be further appreciated that the barrier layer could be defined by a material other than a metal foil as herein described. In this respect, the laminate materials will be determined at least in part by the product with which the tube is to be used. Still further, if the tube were to be used for the body of a dispensing container in which the metal foil would not contaminate the product or be corroded thereby, the metal foil alone could define the core, or could define the inner layer of a laminate core. The method of the present invention advantageously enables a tube to be formed without thermally bonding the overlapping marginal edges of the core, thus avoiding the expense of equipment for this purpose, eliminating the need for and the expense of providing thermoplastic layers on opposite sides of the core laminate for heat sealing, and thus increasing the selection of core materials and combinations thereof in a laminated core structure. Accordingly, it will be appreciated that many embodiments of the present invention can be made and many changes can be made in the embodiments herein illustrated and described, whereby it is to be distinctly understood that the foregoing descriptive matter is to be interpreted merely as illustrative of the invention and not as a limitation.

Having thus described the invention, it is claimed:

1. A laminated tube having radially inner and outer surfaces and adapted to be used as the body of a collapsible dispensing container comprising, a tubular core having longitudinally extending circumferentially overlapped radially opposed marginal edges and radially inner and outer surfaces, the material of said core providing for said radially opposed marginal edges to be thermally incompatible, said inner surface of said core defining said inner surface of said tube, a seamless sheath of plastic material surrounding and longitudinally coextensive with said core and bonded to said outer surface of said core, and a bead of plastic material thermally compatible with the material of said sheath and extending therefrom between said overlapped marginal edges and about the free edge of the radially inner one of said overlapped edges to provide a mechanical bond between said thermally incompatible marginal edges.

2. The laminated tube according to claim 1, wherein said core is a laminate including a barrier layer and a film of thermosetting plastic material bonded thereto, said thermosetting plastic film providing said inner surface of said core.

3. The laminated tube according to claim 2, wherein said barrier layer is a metal foil.

4. The laminated tube according to claim 2, wherein said thermosetting plastic film is an epoxy resin.

5. The laminated tube according to claim 2, wherein said sheath is a thermoplastic material.

6. The laminated tube according to claim 2, wherein said barrier layer is a metal foil and said thermosetting plastic film is an epoxy resin.

7. The laminated tube according to claim 6, wherein said sheath is a thermoplastic material.

8. The laminated tube according to claim 7, wherein said metal foil provides said outer surface of said core and said sheath is bonded to said foil.

9. A method of making a seamless laminated tube adapted to be used as the body of a collapsible dispensing container comprising, forming a sheet of core material having thermally incompatible surfaces on opposite sides thereof to a tubular configuration having longitudinally extending circumferentially overlapping radially opposed marginal side edges in which said opposite sides of said core material provide for said radially opposed marginal edges to be thermally incompatible, providing a film of plastic between said overlapping marginal side edges to mechanically bond said edges, and then encapsulating said tubular core in a seamless sheath of plastic thermally compatible with the plastic of said film, and curing said plastic material.

10. The method according to claim 9, wherein said sheet of core material is of indeterminate length, continuously forming said sheet to said tubular configuration, and continuously encapsulating said tubular core by extruding said plastic material thereabout.

11. The method according to claim 10, and providing said film continuously in the form of a bead along and about the edge of said sheet defining the radially inner one of said overlapping marginal side edges.

12. A method of making a seamless laminated tube adapted to be used as the body of a collapsible dispensing container comprising, forming a laminate including a layer of barrier material and a thermosetting plastic film into a tubular core with said thermosetting plastic film disposed inwardly and for said tubular core to have longitudinally extending circumferenetially overlapping marginal side edges, said laminate providing for said overlapping side edges to have radially opposed thermally incompatible surfaces, applying a bead of plastic material along and about the free edge of the radially inner one of said marginal side edges for said bead to include a portion extending between and mechanically bonding said overlapping side edges, and then extruding a sheath of plastic material thermally compatible with said bead material about said tubular core.

13. The method according to claim 12, and curing said plastic material of said sheath.

14. The method according to claim 13, and extruding said sheath to have a circular outer surface contour in crosssection.

15. A method of making a seamless laminated tube adapted to be used as the body of a collapsible container comprising, continuously forming an indeterminate length of a laminate including adjacent layers of metal foil and thermosetting plastic into a tubular core with said thermosetting plastic disposed inwardly and for said tubular core to have longitudinally extending circumferentially overlapping side edges, said laminate providing for said overlapping side edges to have radially opposed thermally incompatible surfaces, flowing a bead of plastic material onto the marginal edge of said laminate defining the radially inner one of said overlapped edges for said bead to include a portion extending between and mechanically bonding said overlapped side edges, continuously advancing said tubular core through an extrusion die and extruding a sheath of plastic material thermally compatible with said bead material about said tubular core, and curing said extruded plastic sheath.

16. The method according to claim 15, wherein said material of said sheath is thermoplastic, and cooling said sheath downstream from said extrusion die.

17. The method according to claim 15, wherein said metal foil of said laminate defines the outer surface of said tubular core, and extruding said plastic sheath onto said metal foil.

18. The method according to claim 17, wherein said thermosetting plastic of said laminate is an epoxy resin.

19. The method according to claim 18, and extruding said sheath to have a circular outer surface contour in cross-section.

20. The method according to claim 15, wherein said thermosetting plastic of said laminate is an epoxy resin.

21. A method of making a seamless laminated tube adapted to be used as the body of a collapsible dispensing container comprising, forming a sheet of core material to a tubular configuration having longitudinally extending circumferentially overlapping radially opposed marginal side edges, said core material having thermally incompatible radially inner and radially outer surfaces in said tubular configuration including said radially opposed marginal side edges, providing a film of plastic material between said radially opposed marginal side edges to mechanically bond said opposed side edges, and encapsulating said tubular core in a seamless sheath of plastic thermally compatible with the plastic of said film.

22. A laminated tube having radially inner and outer surfaces and adapted to be used as the body of a collapsible dispensing container comprising, a tubular core including a layer of material providing said inner surface of said tube, said core having longitudinally extending circumferentially overlapped marginal side edges including said layer of material and terminating in circumferentially opposite directions, a seamless sheath of plastic material surrounding and bonded to said core and providing said outer surface of said tube, said plastic material of said sheath being thermally incompatible with said core layer providing said inner surface of said tube, and a film of plastic material compatible with the material of said sheath and extending therefrom between said overlapped marginal side edges to provide a mechanical bond therebetween.

* * * * *